(12) United States Patent  (10) Patent No.: US 11,702,822 B2
Seo                            (45) Date of Patent:     Jul. 18, 2023

(54) METAL HEATER SYSTEM

(71) Applicant: Sang Min Seo, Hwaseong-Si (KR)

(72) Inventor: Sang Min Seo, Hwaseong-Si (KR)

( * ) Notice: Subject to any disclaimer, the term of this patent is extended or adjusted under 35 U.S.C. 154(b) by 858 days.

(21) Appl. No.: 16/612,362

(22) PCT Filed: Dec. 11, 2017

(86) PCT No.: PCT/KR2017/014448
§ 371 (c)(1),
(2) Date: Nov. 8, 2019

(87) PCT Pub. No.: WO2018/212422
PCT Pub. Date: Nov. 22, 2018

(65) Prior Publication Data
US 2020/0332500 A1    Oct. 22, 2020

(30) Foreign Application Priority Data
May 16, 2017 (KR) .......................... 10-2017-0060310

(51) Int. Cl.
*E03B 7/12* (2006.01)
*F16L 53/35* (2018.01)
(Continued)

(52) U.S. Cl.
CPC ................ *E03B 7/12* (2013.01); *F16L 53/35* (2018.01); *H05B 1/0244* (2013.01); *H05B 3/06* (2013.01); *H05B 3/141* (2013.01); *H05B 2203/02* (2013.01)

(58) Field of Classification Search
CPC ... H05B 3/02; H05B 3/08; H05B 3/06; H05B 3/148; H05B 3/141; H05B 3/10;
(Continued)

(56) References Cited

U.S. PATENT DOCUMENTS 4,814,584 A * 3/1989 Bohlender ............... H05B 3/14
                                                     219/535
5,948,303 A * 9/1999 Larson ................. A47C 21/048
                                                     219/486
(Continued)

FOREIGN PATENT DOCUMENTS

DE       8705746 U1   6/1987
GB       2522930 A    8/2015
(Continued)

OTHER PUBLICATIONS

International search report of PCT/KR2017/014448.
Supplementary European Search Report of PCT/KR2017/014448.

*Primary Examiner* — Tu B Hoang
*Assistant Examiner* — Bonita Khlok
(74) *Attorney, Agent, or Firm* — AEON Law, PLLC; Adam L.K. Philipp; David V.H. Cohen

(57) ABSTRACT

A metal heater system. More specifically, a plurality of metal heaters is coupled to the surface of the lower end of a pipeline at predetermined intervals in the longitudinal direction of the pipeline, and PTC heating elements inside the metal heaters conduct heat to local portions of the pipeline. Convection is generated in a fluid inside the pipeline because of the heat conducted to the local portions, and thus the overall pipeline is maintained at a constant temperature, efficiently preventing the freezing and bursting of the pipeline in winter.

8 Claims, 7 Drawing Sheets

(51) Int. Cl.
*H05B 1/02* (2006.01)
*H05B 3/06* (2006.01)
*H05B 3/14* (2006.01)

(58) Field of Classification Search
CPC . H05B 3/12; H05B 3/14; H05B 3/143; H05B 1/0244; H05B 1/023; H05B 2203/02; H05B 2203/016; H05B 2203/013; H05B 2203/011; H05B 2203/009; F16L 53/35; F16L 53/30–38; E03B 7/12; G01F 1/7044; E21B 36/04

USPC .............. 392/465–468, 473, 478–479, 490, 392/458–460, 441, 458–459; 219/481, 219/483, 494, 504–505, 67, 628–629, 219/643; 138/33
See application file for complete search history.

(56) References Cited

U.S. PATENT DOCUMENTS

| | | | | |
|---|---|---|---|---|
| 2010/0264127 | A1* | 10/2010 | Ando | H05B 3/04 29/611 |
| 2011/0297666 | A1* | 12/2011 | Ihle | C04B 35/4682 219/538 |
| 2014/0124499 | A1* | 5/2014 | Wei | H05B 3/42 219/541 |
| 2016/0076704 | A1 | 3/2016 | Keinath | |
| 2016/0161316 | A1* | 6/2016 | Heiligenstein | G01F 1/7044 73/861.95 |

FOREIGN PATENT DOCUMENTS

| | | |
|---|---|---|
| JP | 3640699 B2 | 4/2005 |
| JP | 2010065508 A | 3/2010 |
| KR | 20010001178 U | 1/2001 |
| KR | 101456428 B1 | 10/2014 |
| KR | 20160053629 A | 5/2016 |
| KR | 101681956 B1 | 12/2016 |
| KR | 20170017096 A | 2/2017 |

* cited by examiner

METAL HEATER SYSTEM

TECHNICAL FIELD

The present invention relates to a metal heater system. More specifically, the present invention relates to a metal heater system which is characterized in that a plurality of metal heaters is coupled to the surface of the lower end of a pipeline at predetermined intervals in the longitudinal direction of the pipeline and PTC heating elements inside the metal heaters conduct heat to local portions of the pipeline. Due to these characteristics, convection is generated in a fluid inside the pipeline because of the heat conducted to the local portions and thus the overall pipeline is maintained at a constant temperature, thereby efficiently preventing the freezing and bursting of the pipeline in winter.

BACKGROUND ART

In general, in winter, the freezing and bursting of a pipeline are prevented by wrapping a heating wire around the pipeline and generating heat. The heating wire is continuously wound on the outside of the pipeline in the longitudinal direction of the pipeline, or is attached to the pipeline using an auxiliary material. When heat is generated by the heating wire, thermal convection occurs chiefly in the upper part of the section of the pipeline, and the convection occurring in the longitudinal direction is insignificant, so that a problem arises in that the freezing and bursting of the overall pipeline are not prevented.

Furthermore, when the pipeline is embedded in concrete or an underground embedded portion is long, it is difficult to deploy or replace the heating wire. Due to this, when the temperature drops sharply, a problem arises in that the use of the pipeline is impossible in the case of a material which has a high fluid viscosity or a fluid in which a phase change occurs.

Furthermore, a problem arises in that in order to replace the existing heating wire, it is necessary to remove a heat insulation material wrapped around the heating wire outside the pipeline and the heating wire, to newly install a heating wire, and to wrap a new heat insulation material.

Furthermore, freezing and bursting are prevented by coupling a separate housing including the heating wire to the pipeline. However, when a problem occurs in the heating wire or housing and it needs to be replaced, a problem arises in that excessive cost is incurred because the overall housing needs to be replaced.

Furthermore, when the heating wire is installed on the pipeline, it is installed on the overall pipeline through straight line disposition and rotational winding and is then fastened by a tape. In this case, a problem arises in that excessive energy is consumed and also quality is deteriorated because the efficiency of energy which is conducted to the pipeline is reduced due to the deflection of the heating wire.

Furthermore, in maintenance after installation, problems arise in that an inspection range is excessively wide because the installation is performed on the overall pipeline and in that the state of the heating wire cannot be checked because the heating wire is installed inside the heat insulation material.

Moreover, a problem arises in that a fire occurs due to the hardening of the outer shell of the heating wire, short circuit attributable to shearing, abnormal overheating attributable to the overlapped disposition of the heating wire, or the like. In order to overcome these problems, there is a demand for the invention of a new type of pipeline freezing protection system.

DISCLOSURE

Technical Problem

The present invention is directed to a metal heater system, which is characterized in that a plurality of metal heaters is coupled to the surface of the lower end of a pipeline at predetermined intervals in the longitudinal direction of the pipeline and PTC heating elements inside the metal heaters conduct heat to local portions of the pipeline. Due to these characteristics, convection is generated in a fluid inside the pipeline and thus a pipeline temperature is kept constant, thereby efficiently preventing the freezing and bursting of the pipeline in winter.

Technical Solution

In order to accomplish the above object, the present invention provides a metal heater system for preventing the freezing and bursting of a pipeline, the metal heater system including: a plurality of metal heaters which is coupled to the surface of the lower end of a pipeline at predetermined intervals in the longitudinal direction of the pipeline; a band which fastens the metal heaters to the pipeline; a temperature sensor which is coupled to the pipeline and measures a pipeline temperature; a metal heater control unit which controls the operation of the metal heater; and a control unit which controls the metal heater control unit; wherein the metal heaters conduct heat to coupling portions where the metal heaters are coupled to the pipeline and thus convection is generated inside the pipeline.

Furthermore, each of the metal heaters may include: an upper body which extends in the longitudinal direction of the pipeline; a lower body which is coupled to the surface of the lower end of the pipeline; and a PTC heating element which is located between the upper body and the lower body; and the upper body and the lower body may be selectively coupled to and separated from each other by a plurality of bolts which passes through both the upper body and the lower body in the direction perpendicular to the longitudinal direction of the pipeline.

Furthermore, the lower portion of the lower body may be curved to fit the curvature of the pipeline.

Furthermore, a groove may extend in the lower portion of the upper body in the longitudinal direction of the pipeline, a protrusion may extend on the upper portion of the lower body in the longitudinal direction of the pipeline so that the protrusion is inserted into the groove, and the PTC heating element having the same width as the protrusion may be coupled to the top surface of the protrusion.

Furthermore, a space may be formed by spacing the upper body and the PTC heating element apart from each other, and the space may be filled with silicon.

Furthermore, the surface of the lower body may be coated with a thermally conductive adhesive.

Furthermore, the control unit may compare a preset set temperature with the pipeline temperature measured by the temperature sensor, and may issue an operation command to the metal heater control unit when the pipeline temperature is equal to or lower than the set temperature.

Furthermore, the control unit may perform feedback by checking whether or not the metal heater is operated in accordance with the operation command and reissuing the operation command when the metal heater is not operated in accordance with the operation command.

Furthermore, the control unit may be connected to a communication unit, and the communication unit may transmit the pipeline temperature, stored in a storage unit, to a server under a control of the control unit.

Moreover, the server may receive a remote control signal from a computer or smart device and transfer the remote control signal to the communication unit, and the control unit may receive the remote control signal from the communication unit.

Advantageous Effects

In the conventional technology, when a pipeline is embedded in concrete or an underground embedded portion is long, it is not easy to install the heating wire on the pipeline or to replace the heating wire. In contrast, the metal heater system according to the present invention has an advantage in that it is easy to install and replace a heating wire because it is sufficient if the metal heaters are installed at predetermined intervals and then heat is applied only to local portions of a pipeline.

Furthermore, in the conventional technology, in order to replace the heating wire, the overall heat insulation material wrapped around the heating wire outside the pipeline and the heating wire are removed. In contrast, the metal heater system according to the present invention has an advantage in that operation efficiency and economic efficiency are improved because it is sufficient if a heat insulation material and a metal heater are replaced only in a replacement requiring portion.

Furthermore, the heating elements of the metal heater system according to the present invention are PTC heating elements, so that resistance increases during heat generation and thus limits current to thus prevent the risk of fire and the metal heater system is effective to prevent freezing due to an advantage in which temperature is kept constant despite the fluctuation of outside temperature or power supply voltage.

Furthermore, the lower portion of the lower body of the metal heater system according to the present invention is curved to fit the curvature radius of the pipeline and comes into close contact with the pipeline, so that an advantage arises in that the loss of the amounts of heat generated by the metal heaters is reduced.

Furthermore, due to the structure in which the groove extends in the lower portion of the upper body of the metal heater system according to the present invention in the longitudinal direction of the pipeline, the protrusion extends in the upper portion of the lower body in the longitudinal direction of the pipeline so that the protrusion can be inserted into the groove, and the PTC heating element having the same width as the protrusion is coupled to the top surface of the protrusion, the upper body and the lower body are securely coupled to each other and thus the coupling force of the overall metal heater is increased, the PTC heating elements are protected from external impact, and the PTC heating elements are prevented from being separated. Accordingly, an advantage arises in that the lifespans of the metal heaters are increased.

Furthermore, due to the silicon with which the space formed by spacing the upper and lower bodies of the metal heater system according to the present invention apart from each other is filled, waterproof and dustproof effects are generated, and thus the PTC heating elements can be protected, with the result that an advantage arises in that the lifespans of the metal heaters are increased.

Moreover, an advantage arises in that there is performed the automation in which the control unit of the metal heater system according to the present invention compares a set temperature with a current pipe temperature and operates the metal heaters when the pipe temperature is equal to or lower than the set temperature.

DESCRIPTION OF REFERENCE SYMBOLS

Figure 1:
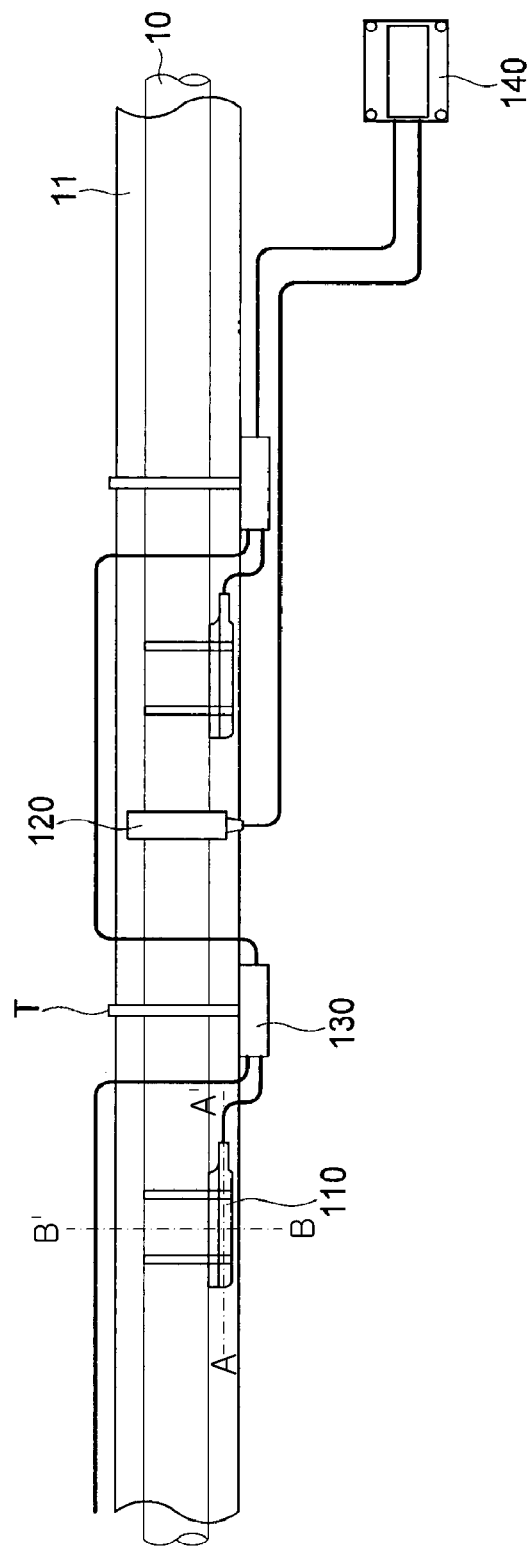
FIG. 1 is a diagram showing a state in which a metal heater system according to the present invention is coupled to a pipeline.

100 . . . metal heater system 110 . . . metal heater
120 . . . temperature sensor 130 . . . metal heater control unit
140 . . . control unit 150 . . . storage unit
160 . . . communication unit 210 . . . server
310 . . . computer 320 . . . smart device

BEST MODE

The present invention may have various modifications and various embodiments, and specific embodiments will be illustrated in the drawings and described in detail in the detailed description. The effects and features of the present invention and methods of achieving them will be apparent by referring to the embodiments described below in detail in conjunction with the accompanying drawings. However, the present invention is not limited to the embodiments disclosed below, but may be implemented in various forms. In the following embodiments, terms such as first and second are not used in a restrictive sense, but are each used to distinguish one component from another component. Furthermore, a singular expression includes a plural expression unless the context clearly indicates otherwise. Furthermore, the terms 'include,' 'have,' etc. mean that there is a feature or component described in the specification, and does not preclude the possibility of adding one or more other features or components in advance. Furthermore, in the drawings, the sizes of components may be exaggerated or reduced for ease of description. Since the size and thickness of each component shown in the drawing are arbitrarily selected for the ease of description, the present invention is not necessarily limited to those shown in the drawing.

Embodiments of the present invention will be described in detail below with reference to the accompanying drawings.

In the description given with reference to the drawings, like reference symbols will be assigned to like or corresponding components, and redundant descriptions thereof will be omitted.

FIG. 1 is a diagram showing a state in which a metal heater system according to the present invention is coupled to a pipeline. The components of the metal heater system according to the present invention will be described below with reference to FIG. 1.

The metal heater system 100 according to the present invention includes a metal heater 110, a band T, a temperature sensor 120, a metal heater control unit 130, and a control unit 140.

Figure 2:
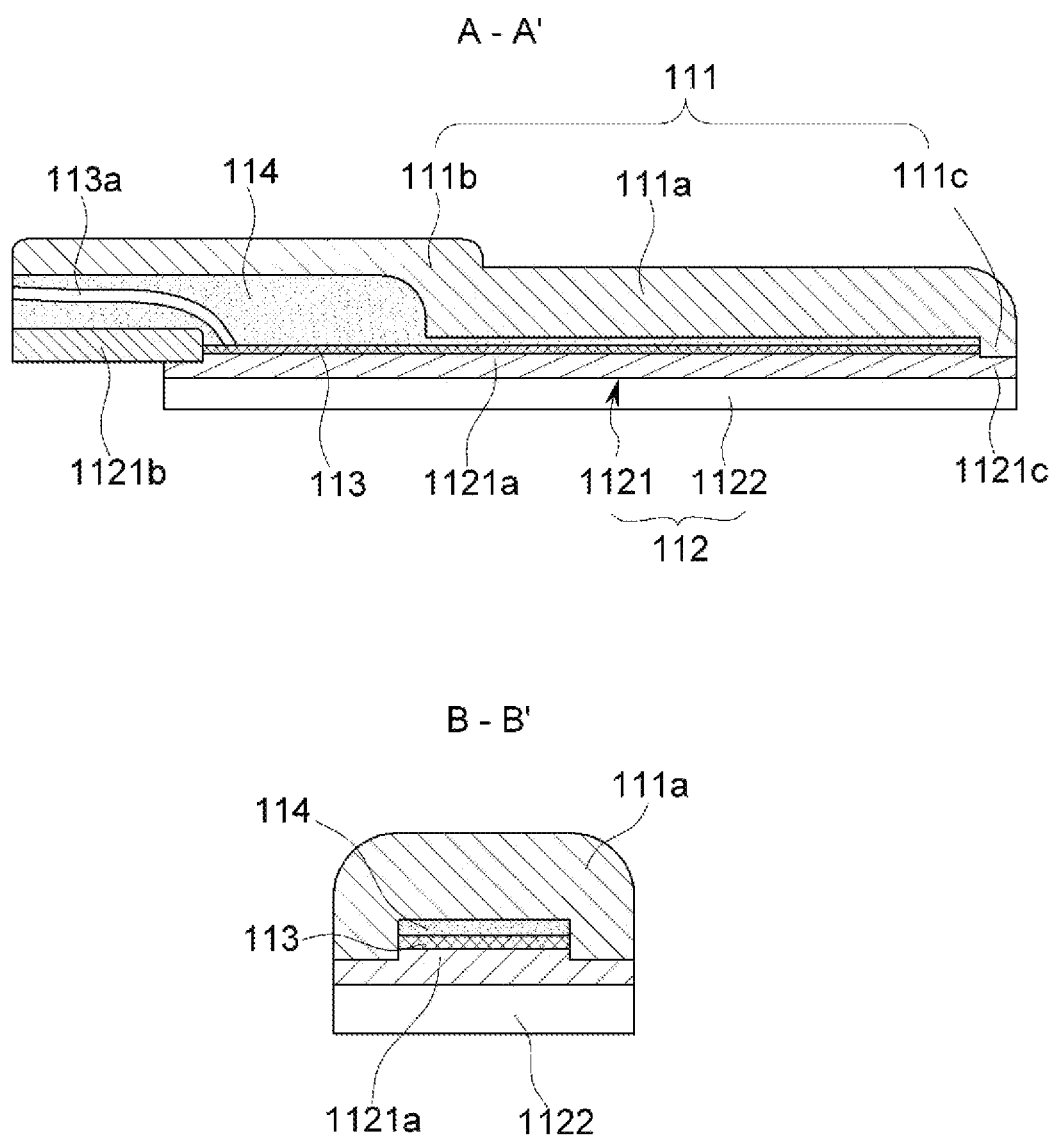
FIG. 2 shows a sectional view of a metal heater according to the present invention taken along line A-A' in the longitudinal direction of the metal heater and a sectional view of the metal heater taken along line B-B' in the direction perpendicular to the longitudinal direction.
Figure 3:
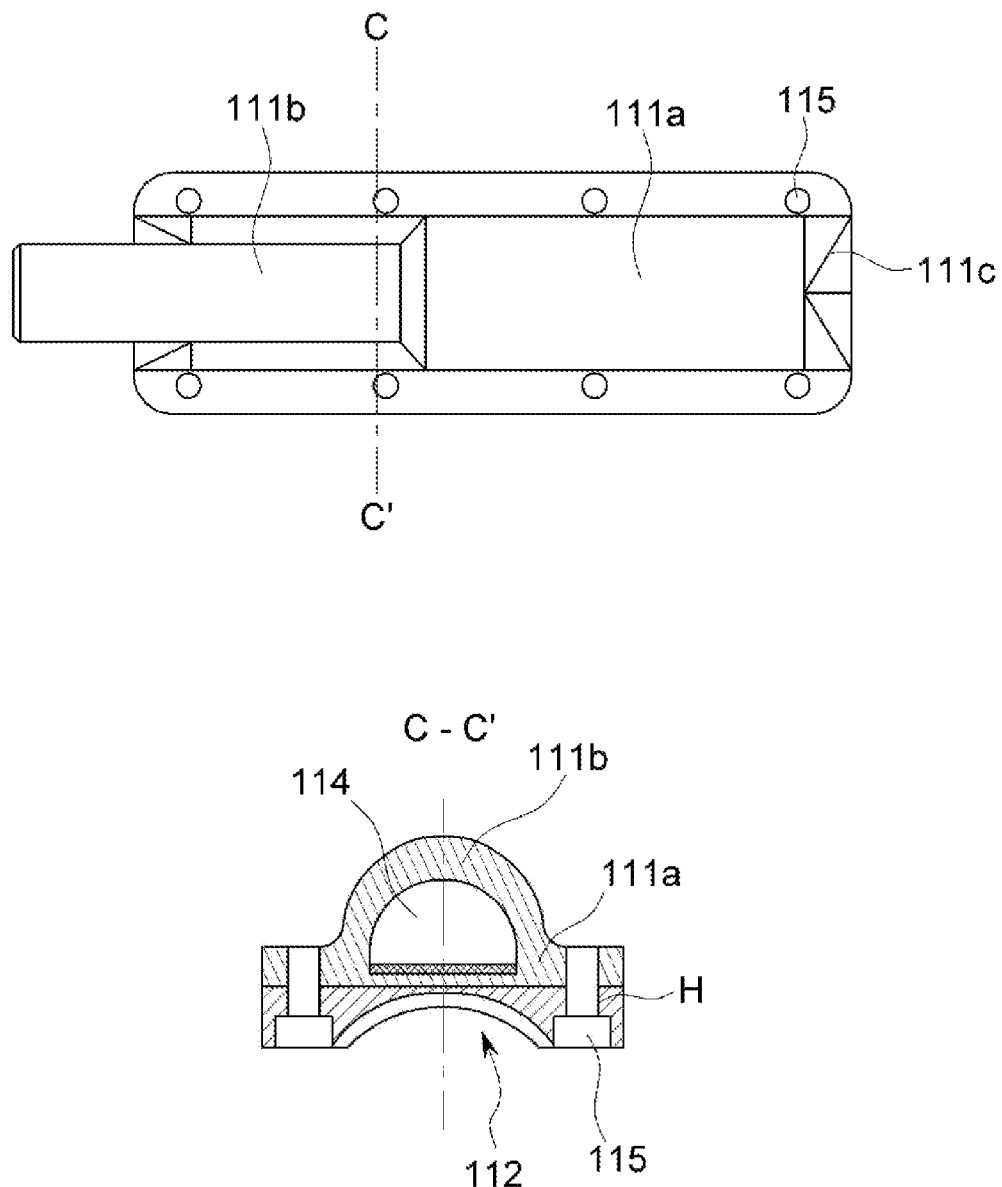
FIG. 3 shows a top view of the metal heater according to the present invention and a sectional view of the metal heater taken along line C-C'.

The metal heater 110 is coupled to a pipeline 10, and functions as a heating element configured to generate heat. For a description of the detailed structure of the metal heater 110, reference will be made to FIGS. 2 and 3. FIG. 2 shows a sectional view of the metal heater 110 taken along line A-A' in the longitudinal direction of the metal heater 110 and a sectional view of the metal heater 110 taken along line B-B' in the direction perpendicular to the longitudinal direction, and FIG. 3 shows a top view of the metal heater 110 and a sectional view of the metal heater 110 taken along line C-C'.

The metal heater 110 includes an upper body 111, a lower body 112, and a PTC heating element 113. The upper body 111 extends in the longitudinal direction of the pipeline 10. Furthermore, the upper body 111 is coupled to the lower body 112 extending in the longitudinal direction of the pipeline 10. The lower body 112 is brought into contact with and coupled to the surface of the pipeline 10. In particular, the lower body 112 is preferably coupled to the surface of the lower end of the pipeline 10. This is intended for convection, and will be described in detail in conjunction with FIG. 4.

A PTC heating element 113 is located between the upper body 111 and the lower body 112. The PTC heating element 113 is preferably formed in a panel shape which extends in the longitudinal direction of the pipeline 10. A PTC (positive temperature coefficient) material refers to barium titanate-based ceramic, and has the characteristic in which resistance increases as temperature rises. At low temperatures, relatively small resistance values are formed. When a specific temperature is reached, resistance increases, exhibiting a large increase. It is widely used in hair dryers, rice cookers, coffee pots, etc. in everyday life. In order to prevent the freezing and bursting of a pipeline, the temperature of a fluid needs to be constant. Accordingly, when the PTC heating element 113 is used in accordance with the present invention, an advantage arises in that resistance increases during the generation of heat and limits current and temperature is kept constant despite the fluctuation of outside temperature or power supply voltage, which is effective in preventing freezing and bursting. Furthermore, in the case of the pipeline 10, a problem arises in that it is difficult to check the risk of fire because the pipeline 10 is in a place which the eyes of a manager usually do not reach. In contrast, when the PTC heating element 113 according to the present invention is used, current is blocked when a specific temperature is reached, and thus an advantage arises in that and the risk of fire is also lowered because the risk of overheating is reduced.

The PTC heating element 113 is connected by an electric wire 113a. One end of the electric wire 113a is inserted into the metal heater 110 and connected to the PTC heating element 113, as shown in FIG. 2, and the other end of the electric wire 113a is drawn out of the metal heater 110 and connected to the metal heater control unit 130. The operation of the PTC heating element 113 is controlled by the metal heater control unit 130.

It is preferable that the upper body 111 and the lower body 112 be selectively coupled to and separated from each other in an assembly manner Referring to FIG. 3, it is preferable that the bolts 115 couple and support the upper body 111 and the lower body 112 by simultaneously passing through the upper body 111 and the lower body 112 in the direction perpendicular to the longitudinal direction of the pipeline 10 (a direction from the lower part to the upper part based on the sectional view of FIG. 3). It is preferable that the bolts 115 include a plurality of bolts and be coupled at predetermined intervals.

The conventional technology has a problem in that in order to replace a heating wire because the lifespan of the heating wire is over, it is necessary to remove a heat insulation material surrounding a heating wire outside the pipeline 1 and the heating wire, to reinstall a heating wire, and to wrap a new heat insulation material. In contrast, when the upper body 111 and the lower body 112 are configured to be selectively coupled to and separated from each other by the bolts according to the present invention, there is formed a simple structure in which it is sufficient if the upper body 111 and the lower body 112 are separated from each other by loosening the bolts 115, the PTC heating element 113 is replaced, a new PTC heating element 113 is inserted, and the bolts are tightened again. Due to this, advantages arise in that the ease of replacement is increased and replacement cost is reduced, unlike in the conventional technology.

Furthermore, since the metal heater 110 is assembled by the bolts 115, it is fastened at a predetermined thickness due to the tension of the bolts 115 upon assembly. Accordingly, the area where the metal heater 110 comes into contact with the pipeline 10 is constant and the amount of heat applied to the pipeline 10 by the PTC heating element 113 is constant, and thus an advantage arises in that a pipeline temperature is kept constant.

It is preferable that the lower portion of the lower body 112 be curved to have the curvature radius of the pipeline 10 in accordance with the curvature of the pipeline 10. Referring to the sectional view of FIG. 3, the lower body 112 is curved to fit the curvature radius of the pipeline 10. Due to this structure, the lower body 112 may come into contact with the surface of the lower end of the pipeline 10, as shown in FIG. 1.

When the lower body 112 is formed in a flat structure and coupled to the surface of the lower end of the pipeline 10, only the central portion of the lower body 112 comes into contact with the pipeline 10, and the side portions of the lower body 112 in the longitudinal direction do not come into contact with the pipeline 10. Accordingly, the amount of heat directly transferred to the pipeline 10 becomes smaller than the amount of heat generated by the PTC heating element 113, and thus a problem arises in that energy efficiency is reduced. In contrast, when the lower body 112 is curved to fit the curvature radius of the pipeline 10 as in the present invention, the surface where the lower body 112 comes into contact with the pipeline 10 is increased and thus the amount of heat transferred to the pipeline 10 is increased, with the result that an advantage arises in that energy efficiency is increased. Furthermore, an advantage arises in that there does not occur a phenomenon in which the efficiency of energy conducted to the pipeline 10 is reduced due to the deflection of the conventional heating wire.

It is preferable that a groove be formed in the bottom of the upper body 111 in the longitudinal direction of the pipeline 10 and a protrusion is formed on the top of the lower body 112 in the longitudinal direction of the pipeline 10 to be inserted into the groove. Furthermore, it is preferable that the PTC heating element 113 having the same width as the protrusion be coupled to the top surface of the protrusion.

Accordingly, it is preferred that the upper body 111, particularly the bottom of the central portion 111a of the upper body 111, be formed in a shape obtained by rotating a '⊔' shape in the direction of the lower portion of the central portion 111a by 180 degrees and the lower body 112, particularly the top of the central portion 1121a of the lower body 112, be formed in a '⊓' shape (see the sectional view of FIG. 2 taken along line B-B'). Furthermore, it is preferable that the PTC heating element 113 and the groove of the upper body 111 be spaced apart from each other and form a space.

In other words, there is formed a structure in which the lower body 112 supports the PTC heating element 113 upward and the upper body 111 surrounds the PTC heating element 113. Due to this structure, the upper body 111 and the lower body 112 are firmly coupled, and thus the coupling force of the overall metal heater 110 is increased. Furthermore, the left and right sides of the PTC heating element 113 are supported by the upper body 111, the bottom of the PTC heating element 113 is supported by the lower body 112, and the top of the PTC heating element 113 is supported by the silicon 114, as will be described later. Accordingly, the PTC heating element 113 is not removed, and thus an advantage arises in that coupling force is increased.

Furthermore, a space formed by the above-described structure may be filled with silicon 114. When the space is filled with the silicon 114, there is formed a shape in which the PTC heating element 113 and the electric wire 113a connected to the PTC heating element 113 are surrounded by the silicon 114 (see FIG. 2). The PTC heating element 113 and the electric wire 113a connected to the PTC heating element 113 have a problem in that the lifespans thereof are reduced when they are exposed to an external impact and moisture and dust. However, when the space is filled with the silicon 114, as in the present invention, the space filled with the silicon 114 functions as a type of protection film, and thus advantages arise in that the waterproof and dust-proof properties of the PTC heating element 113 and the electric wire 113a connected to the PTC heating element 113 are provided and the lifespan of the overall metal heater system 100 is increased. Furthermore, in the case of the silicon 114, the manufacturing cost thereof is inexpensive, and thus an advantage arises in that economic efficiency is improved.

It is preferable that a groove be formed in such a manner that one end 1121c of the lower body 112 is depressed in the downward one of the directions perpendicular to the longitudinal direction of the pipeline 10. In this case, the downward one of the directions perpendicular to the longitudinal direction of the pipeline 10 refers to the direction from the northern side to the southern side based on FIG. 2. Furthermore, it is preferable that one end 111c of the upper body 112 protrude in the downward one of the directions perpendicular to the longitudinal direction of the pipeline 10 so that it can be inserted into the groove.

Accordingly, in one end of the metal heater 110, one end 111c of the upper body 111 and one end 1121c of the lower body 112 come into direct contact with each other, and thus the silicon 114 is prevented from being exposed out of the metal heater 110, with the result that an advantage arises in that the lifespan of the metal heater 110 may be increased.

It is preferable that the other end 111b of the upper body 111 and the other end 1121b of the lower body 112 protrude while forming a cylindrical housing shape when being coupled to each other. The other end 111b of the upper body 111 and the other end 1121b of the lower body 112 are the places through which the electric wire 113a is introduced. When the band T is fitted over the places through which the electric wire 113a is introduced and fastens the metal heater 110 and the pipeline 10, the band T is formed in a shape in which it is wound around the metal heater 110 due to a cylindrical shape, and an advantage arises in that the coupling force of the metal heater 110 is increased. Furthermore, due to this feature, an advantage arises in that the location at which the band T can be coupled is various.

It is preferable that the lower surface of the lower body 112 be coated with a thermally conductive adhesive (not shown). When the metal heater 110 is brought into close contact with the pipeline 10, the metal heater 110 and the pipeline 10 may not be brought into completely close contact. In this case, a thermally conductive adhesive fills an air layer between the metal heater 110 and the pipeline 10, and may thus increase thermal conductivity. Furthermore, the metal types of metal heater 110 and pipeline 10 are different, and thus an advantage arises in that galvanic corrosion may be prevented.

It is preferable that the upper body 111 and the lower body 112 be made of an aluminum material. Aluminum is advantageous in that it has excellent thermal conductivity and may maintain predetermined heat generation quality, and thus has the advantage of maximizing the heat emission performance of the metal heater 110. As an example, It is preferable that the upper body 111 and the lower body 112 be made of an aluminum 6061-based material. The reason for this is that this material has excellent strength.

The band T fastens the metal heater 110 to the pipeline 10. As shown in FIG. 1, it is preferable that the band T be formed in a shape which surrounds the outer surfaces of the pipeline 10 and the metal heater 110. It is preferable that the band T presses the metal heater 110 so that the lower body 112 of the metal heater 110 comes into close contact with the surface of the lower end of the pipeline 10. Due to this structure, advantages arise in that the metal heater 110 may be easily fastened to the pipeline 10 and the metal heater 110 is easily detached and attached when it is replaced.

The lower body 112 may be divided into a lower body main body 1121 and a connector 1122. The connector 1122 is preferably made of a metal having an excellent heat emission property, and functions to amplify the heat emission property of the metal heater 110.

Figure 4:
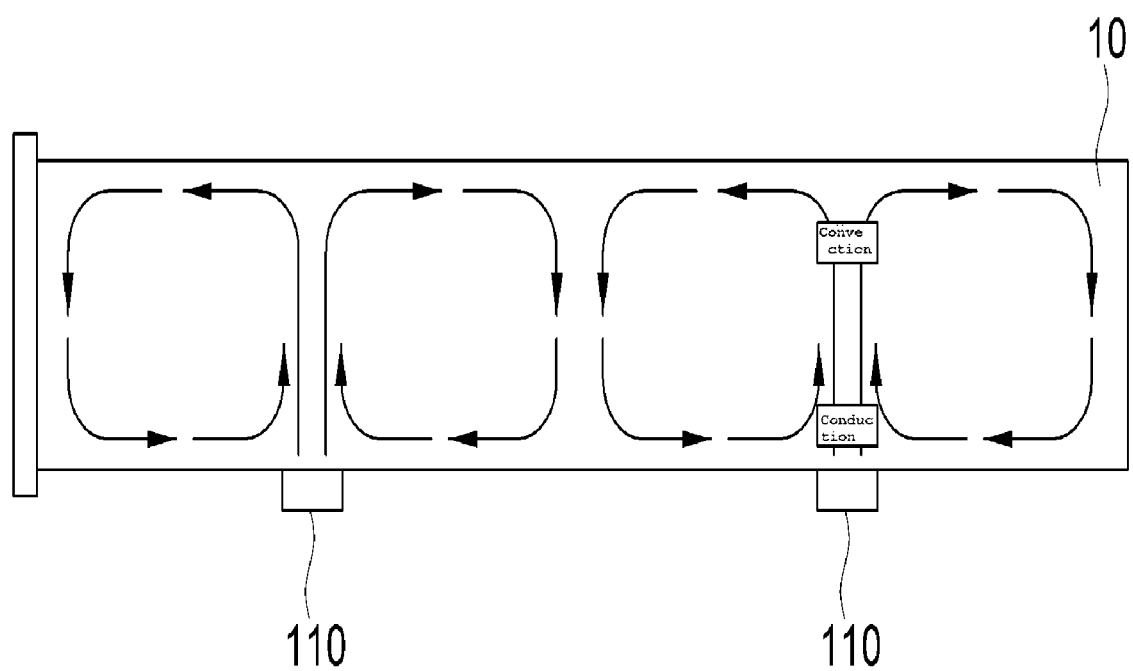
FIG. 4 shows a convection phenomenon which occurs inside a pipeline when the metal heater according to the present invention is coupled to the pipeline.

FIG. 4 shows a convection phenomenon which occurs inside the pipeline 10 when the metal heater 110 according to the present invention is coupled to the pipeline 10.

When the metal heater 110 according to the present invention is coupled to the surface of the lower end of the pipeline 10, the heat of the metal heater 110 is conducted to the surface of the lower end of the pipeline 10. Accordingly, the local portion of the lower end of the pipeline 10 is heated, so that a fluid located near the heated portion of the pipeline 10 is made lighter and is raised to the upper end of the pipeline 10 and a fluid located near the upper end of the pipeline 10 is lowered to the lower end of the pipeline 10 (the arrows of FIG. 4 indicate the flows of fluids). This is a convection phenomenon, and the overall temperature of a fluid within the pipeline 10 is raised due to the convection phenomenon.

In the case of the conventional technology, the temperature of the pipeline 10 is raised by coupling a heating wire to the overall pipeline 10. In contrast, in the case of the present invention, the temperature of the pipeline 10 may be raised by installing the metal heater 110 on a local portion and generating convection. Accordingly, it is sufficient if the metal heater 110 is installed only on the local portion of the pipeline 10 rather than the overall pipeline 10 unlike in the conventional technology, and thus an advantage arises in that economic efficiency is improved.

Furthermore, when a problem occurs in the metal heater 110, it is sufficient if the heat insulation material 11 is locally removed and only the corresponding portion of the metal heater 110 is replaced unlike in the conventional technology, and thus an advantage arises in that the convenience of repair and maintenance is increased.

Figure 5:
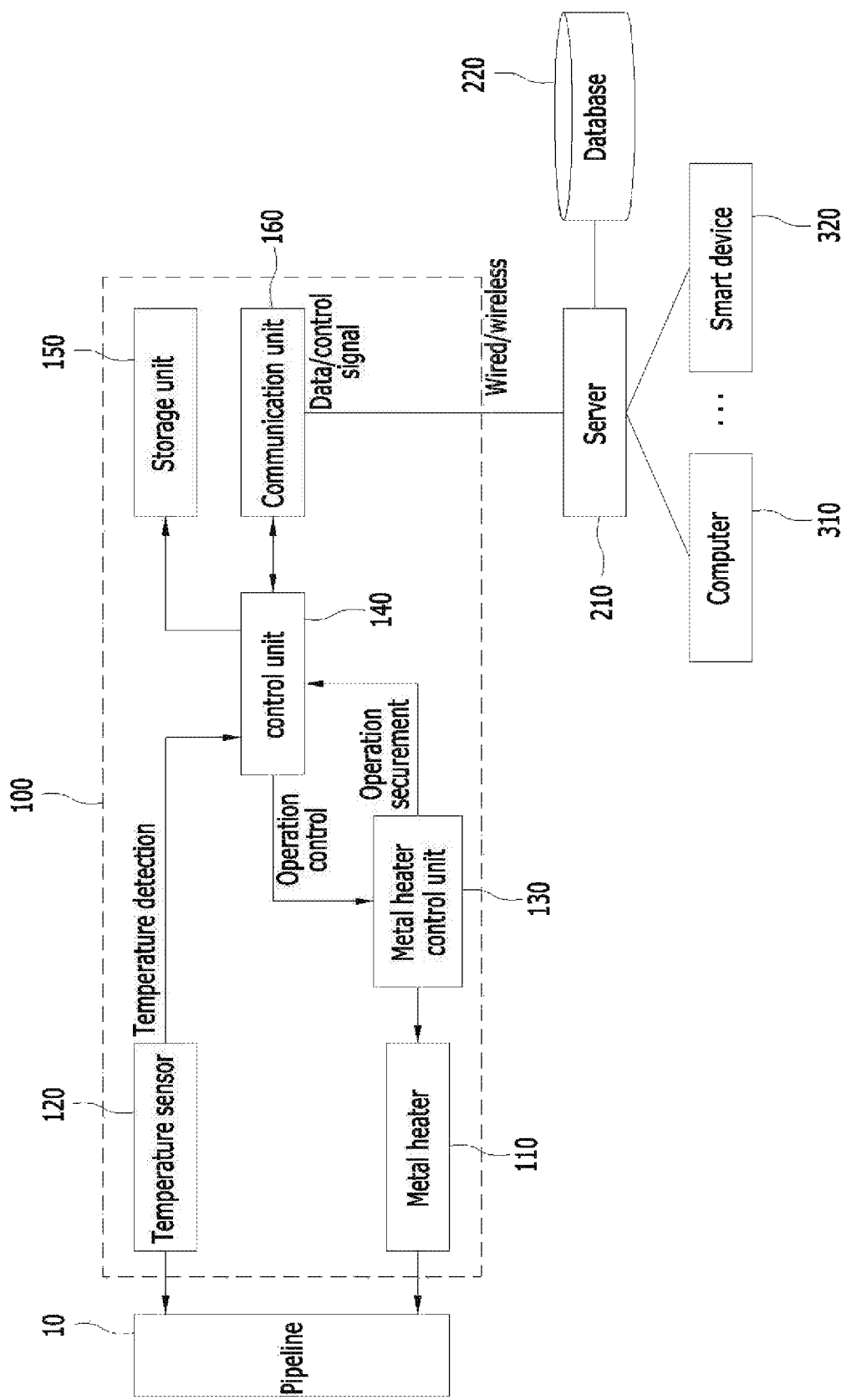
FIG. 5 is a block diagram showing the configuration of the metal heater system according to the present invention.

FIG. 5 is a block diagram showing the configuration of the metal heater system according to the present invention. The temperature sensor 120, the metal heater control unit 130, the control unit 140, and other components will be described with reference to FIG. 5.

The temperature sensor 120 is coupled to the pipeline 10 (see FIG. 1), and may detect a pipeline temperature, the temperature of water contained within the pipeline 10, and a temperature around the pipeline.

The metal heater control unit 130 controls the operation of the metal heater 110. Furthermore, the metal heater control unit 130 is controlled by the control unit 140. When the control unit 140 issues a command regarding operation, the metal heater control unit 130 may control the operation of the metal heater 110 based on the command. Accordingly, when the control unit 140 issues a command to operate the metal heater 110 to the metal heater control unit 130, the metal heater control unit 130 operates the metal heater 110 based on the command, and the PTC heating element 113 inside the metal heater 110 generates heat, thereby preventing freezing and bursting. Furthermore, when the control unit 140 issues a command to stop the operation of the metal heater 110 to the metal heater control unit 130, the metal heater control unit 130 stops the operation of the metal heater 110 based on the command, and the PTC heating element 113 inside the metal heater 110 does not generate heat, thereby allowing the temperature of the pipeline 10 to be kept constant.

The control unit 140 may prevent the freezing or freezing and bursting of the pipeline 10 by controlling the metal heater control unit 130. In this case, the control unit 140 may set a temperature in advance, and may operate the metal heater 110 by issuing an operation command to the metal heater control unit 130 when a current pipeline temperature detected by the temperature sensor 120 is equal to or lower than the set temperature and stop the operation of the metal heater 110 by issuing an operation stop command to the metal heater control unit 130 when the pipeline temperature is higher than the set temperature. Due to the above-described automatic control process, advantages arise in that operation efficiency is increased because an administrator does not need to continuously check a pipeline temperature and freezing or freezing and bursting may be precisely prevented via temperature.

As an example, the set temperature may be a critical temperature (0 degrees). The reason for this is that the freezing and bursting of the pipeline 10 may occur when the temperature is equal to or less than the critical temperature. In this case, the set temperature may be lower when there is flow rate inside the pipeline 10, and may be higher when there is no flow rate inside the pipeline 10.

The control unit 140 performs a control operation for the prevention of the freezing or freezing and bursting of the pipeline 10, and checks whether the control operation has been normally performed. In other words, whether the metal heater system 100 has been normally operated may be checked through feedback. Although a signal adapted to operate the metal heater 110 is output, normal control may not be performed due to a breakdown of the metal heater 110, and thus a pipeline temperature may be kept equal to or lower than the critical point. If the control unit 140 additionally controls the operation of the metal heater 110 in the above-described situation, there may occur a case where a situation is rather worsened. In other words, reliability may be improved by checking whether the metal heater system 100 is in a normal operating state.

The storage unit 150 stores the current pipeline temperature detected by the temperature sensor 120 in real time. The pipeline temperature stored in the storage unit 150 is periodically transmitted to the server 210 while taking into account a communication load. The period at which the information is transmitted is controlled according to the communication load.

The communication unit 160 transmits information (or data), stored in the storage unit 150, to the server 210 or receives a remote control signal from the server 210 and outputs the signal to the control unit 140 under the control of the control unit 140. The communication unit 160 is connected to the server 210 in a wired/wireless manner.

As an example, the communication unit 160 may perform communication via serial communication including RS232 and RS485, Bluetooth, Universal Serial Bus (USB), Ethernet, etc. Additionally, various communication methods may be applied.

In the metal heater system 100 according to the present invention, the operation of the metal heater 110 for the prevention of the freezing or freezing and bursting may be automatically performed (an automatic mode), or may be remotely performed by receiving a remote control signal from an administrator (a manual mode). However, in an either case where automatic control is performed or remote control is manually performed, there may be performed the alarm operation of notifying the administrator of the state of the pipeline 10. Accordingly, the present invention has an advantage in that not only the operation for the prevention of the freezing or freezing and bursting of the pipeline 10 but also an automatic and rapid reason to a case where freezing or freezing and bursting occur in the pipeline 10.

In this case, as described above, the automatic mode refers to a mode in which control unit 140 controls the operation of the metal heater 110 by comparing the set temperature and the current pipeline temperature with each other, and the manual mode refers to a mode in which an administrator controls the operation of the metal heater 110 by controlling the control unit 140 through remote control. The automatic mode and the manual mode may be changed by a separate converter which is not shown in the drawings, and may be set according to the convenience of the administrator as desired.

Figure 6:
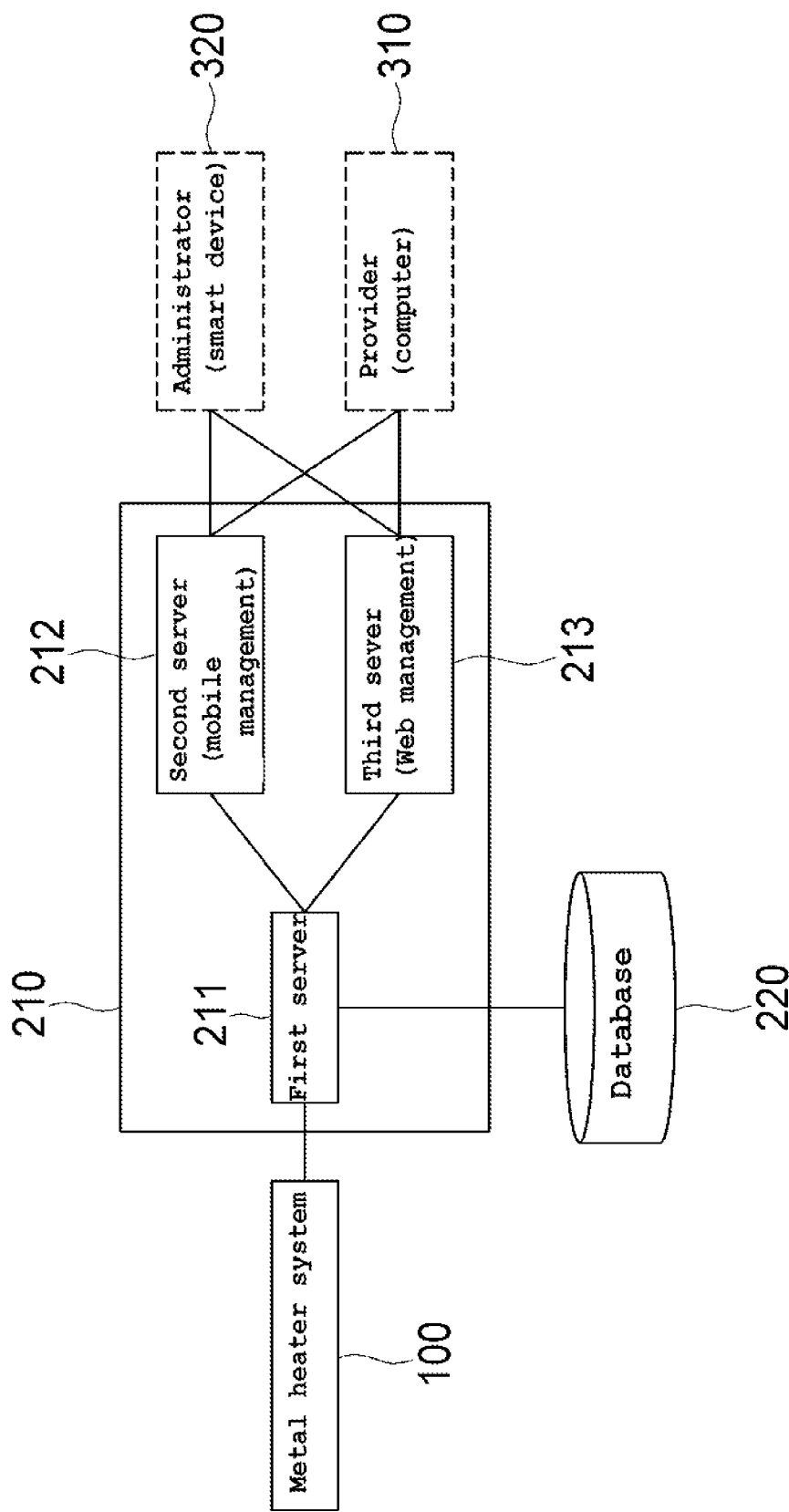
FIG. 6 is a block diagram schematically showing a remote control flow via a server according to the present invention.

FIG. 6 is a block diagram schematically showing a remote control flow via the server 210. A manual mode and the components of the server 210 related to the manual mode will be described in detail below with reference to FIG. 6.

In the case of the manual mode, the control unit 140 compares the set temperature and the current pipeline temperature with each other, and transmits an alarm signal to the server 210 through the communication unit 160 when the current pipeline temperature is equal to or lower than the set temperature. The server 210 immediately transmits a pipeline temperature and an alarm signal to a computer 310 or smart device 320, which is a terminal of an administrator, thereby allowing the administrator to become aware of the current state of the pipeline 10.

When the administrator becomes aware that the temperature of the pipeline 10 is a temperature at which the freezing or freezing and bursting of the pipeline 10 are expected, he or she transmits a remote control signal to the server 210 through the smart device 320 or computer 310. The server 210 may receive the remote control signal from the administrator and transmit the remote control signal to the metal heater system 100, and the metal heater system 100 may prevent the freezing or freezing and bursting of the pipeline 10 by operating the metal heater 110 according to the remote control signal.

The smart device 320 refers to a device which may be implemented to fit various functions and a considerable part of each function of which may be changed or extended via an application program (an app), and includes, e.g., a smartphone, a smart tablet, a smart pad, a smart TV, a smart key, a smart card, etc.

In particular, the smartphone is constructed by combining a conventional mobile phone function with a data communication function such as an Internet access function. In other words, advantages arise in that the smart device itself may access the Internet anytime and anywhere over a mobile communication network without accessing the wired Internet requiring the use of a fixed IP address or a Wi-Fi network requiring the use of an access password and may immediately access a designated server or webpage.

Accordingly, by using the above-described advantages of the smart device 320, the present invention may access a server, in which various types of data and software related to the repair and maintenance of the metal heater system 100 have been stored, by using a previously registered specific smart device (or a smart device of a previously registered administrator), may check the operating state of the metal heater system 100 via the accessed server, and may remotely and conveniently perform a repair and maintenance operation anytime and anywhere. Furthermore, the stored information may be searched.

The smart device 320 and the computer 310 may be considered to be administrator terminals. In this case, the server 210 allows the server, in which various types of data and software related to the repair and maintenance of the metal heater system 100 have been stored, to be accessed through a computer having a previously registered Internet Protocol (IP) address, a computer logged in to using a previously registered ID and password, or a computer accessed using the address of a previously registered LAN card, and the administrator may check the operating state of the metal heater system 100 via the accessed server 210 and conveniently and remotely perform a repair and maintenance operation on the metal heater system 100 anytime and anywhere.

In this case, the server 210 may include a mobile management server (a second server) 212 configured to perform management so that the metal heater system 100 is accessed using the smart device 320, and a web management server (a third server) 213 configured to perform management so that the metal heater system 100 is accessed using the computer 310. Furthermore, the server 210 may include a general server (a first server) 211 configured to manage all servers and a database 220 in which various types of data and software related to the repair and maintenance of the metal heater system 100 have been stored. In other words, the server 210 may include servers configured to perform separate functions.

Figure 7:
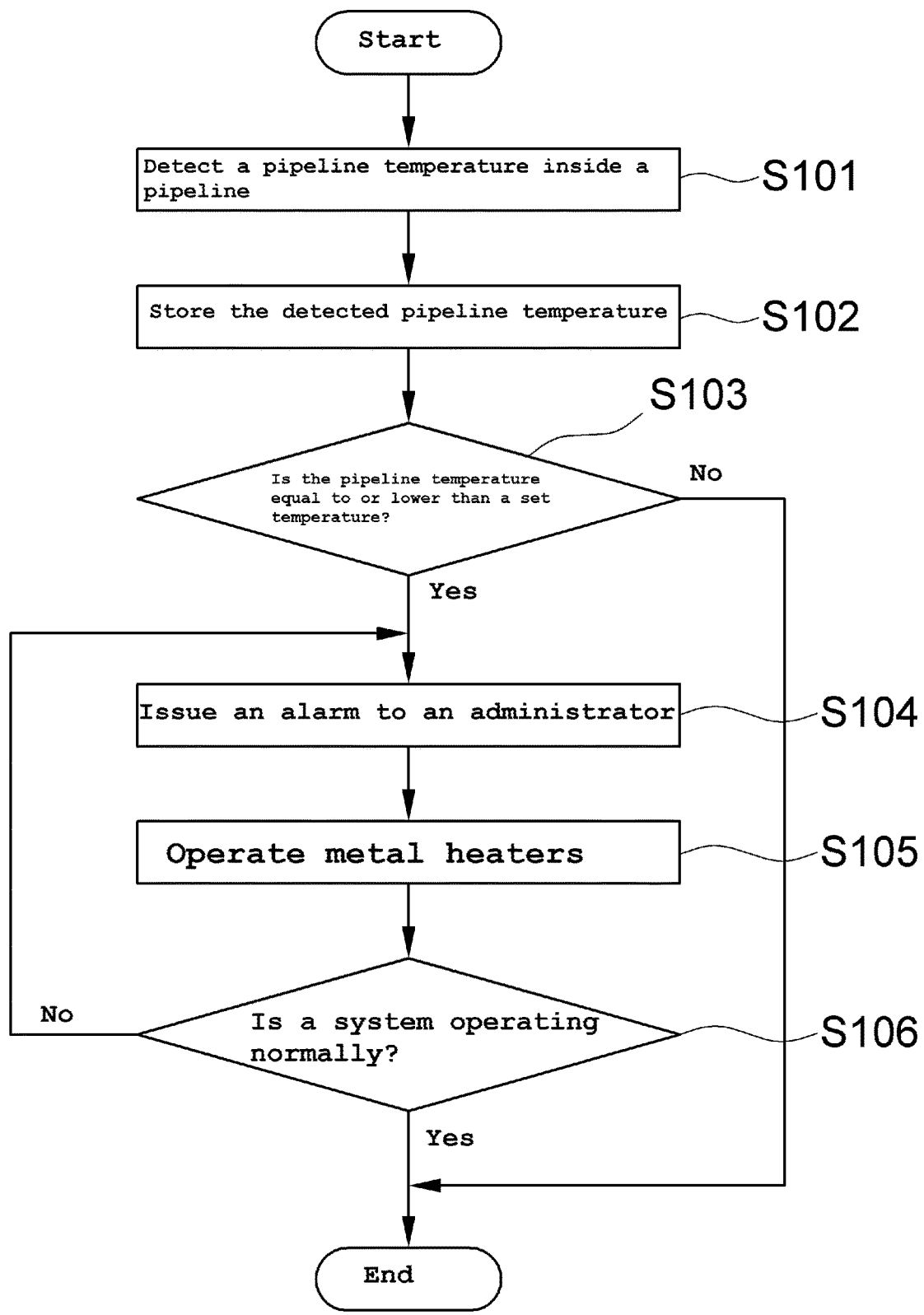
FIG. 7 is a flowchart showing the operation flow of the metal heater system according to the present invention.

FIG. 7 is a flowchart showing the operation flow of the metal heater system 100 according to the present invention. First, the temperature sensor 120 detects a pipeline temperature inside the pipeline 10 at step S101. The detected pipeline temperature is stored in the storage unit 150 at step S102, and the control unit 140 determines whether or not a current pipeline temperature is equal to or lower than a previously set temperature by comparing the pipeline temperature with the set temperature at step S103.

When the pipeline temperature is equal to or lower than the set temperature, the freezing or freezing and bursting of the pipeline 10 may occur, and thus an administrator is notified of this situation via the communication unit 160 and the server 210 at step S104. In this case, the administrator may be notified of this situation regardless of an automatic mode and a manual mode.

Thereafter, the metal heater 110 is operated, and heat is generated by the PTC heating element 113. In an automatic mode, the metal heater 110 is operated without requiring the remote control of a separate administrator. In a manual mode, an administrator transmits a remote operation signal by using the computer 310 or smart device 320.

Once the metal heater 110 has been operated, the control unit 140 determines whether or not the metal heater system 100 is normally operated at step S106. Therefore, a secondary safety-related accident may be prevented from occurring.

The above-described embodiment according to the present invention may be implemented in the form of program instructions which can be executed by a variety of computer means, and may be stored in a computer-readable storage medium. The computer-readable storage medium may include program instructions, a data file, and a data structure solely or in combination. The program instructions which are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code which is constructed by a compiler but also high-level language code which can be executed by a computer using an interpreter or the like. The above-described hardware components may be converted into one or more software modules in order to perform the operation of the present invention, and vice versa.

The specific operations described in the present invention are examples, and do not limit the scope of the present invention in all aspects. For brevity of specification, descriptions of conventional electronic configurations, control systems, software, and other functional aspects of systems may be omitted. Furthermore, the connections of lines or connection members between components are examples of functional connections and/or physical or circuit connections. They may be various functional connections, physical connections, or circuit connections which may be replaced and added in actual devices. Moreover, if there is no specific reference such as "essential" or "important," a corresponding component may not necessarily be a required component for the application of the present invention.

Furthermore, although the detailed description of the present invention has been given with reference to the preferred embodiments of the present invention, it will be appreciated by those skilled in the corresponding art or those having ordinary knowledge in the corresponding art that various modifications and changes may be made to the present invention without departing from the spirit and technical scope of the present invention described in the attached claims to be described below. Therefore, the technical scope of the present invention is not limited to the details described in the detailed description of the specification, but should be defined by the attached claims.

INDUSTRIAL APPLICABILITY

The present invention relates to the metal heater system. More specifically, the present invention relates to the metal heater system which is characterized in that the plurality of metal heaters is coupled to the surface of the lower end of a pipeline at predetermined intervals in the longitudinal direction of the pipeline and the PTC heating elements inside the metal heaters conduct heat to local portions of the pipeline. Due to these characteristics, convection is generated in a fluid inside the pipeline because of the heat conducted to the local portions and thus the overall pipeline is maintained at a constant temperature, thereby efficiently preventing the freezing and bursting of the pipeline in winter.

The invention claimed is:

1. A metal heater system for preventing freezing and bursting of a pipeline, the metal heater system comprising:
a plurality of metal heaters coupled to a surface of a lower end of a pipeline at predetermined intervals in a longitudinal direction of the pipeline;
for each metal heater:
a band that fastens the metal heater to the pipeline; and
a temperature sensor that is coupled to the pipeline and measures a pipeline temperature;
wherein the metal heaters conduct heat to coupling portions where the metal heaters are coupled to the pipeline and thus convection is generated inside the pipeline;
wherein each of the metal heaters comprises:
an upper body that extends in the longitudinal direction of the pipeline;
a lower body that is coupled to the surface of the lower end of the pipeline; and
a PTC heating element that is located between the upper body and the lower body;
wherein the upper body includes a groove that extends in a lower portion of the upper body in the longitudinal direction of the pipeline, and the lower body includes a protrusion that extends on an upper portion of the lower body in the longitudinal direction of the pipeline so that the protrusion is inserted into the groove and the PTC heating element is coupled to a top surface of the protrusion;
wherein a space is formed by spacing the upper body and the PTC heating element apart from each other, and the space is filled with silicon, and the silicon is formed within the groove; and
wherein the left and right sides of the PTC heating element are directly supported by the upper body, the bottom of the PTC heating element is directly supported by the lower body, and the top of the PTC heating element is directly supported by the silicon.

2. The metal heater system of claim 1, wherein the upper body and the lower body are selectively coupled to and separated from each other by a plurality of bolts that pass through both the upper body and the lower body in a direction perpendicular to the longitudinal direction of the pipeline.

3. The metal heater system of claim 2, wherein a lower portion of the lower body is curved to fit a curvature of the pipeline.

4. The metal heater system of claim 1, wherein a surface of the lower body is coated with a thermally conductive adhesive.

5. The metal heater system of claim 4, wherein a controller compares a preset set temperature with the pipeline temperature measured by the temperature sensor of a first metal heater of the plurality of metal heaters, and issues an operation command to operate the first metal heater when the pipeline temperature is equal to or lower than the set temperature.

6. The metal heater system of claim 5, wherein the controller performs feedback by checking whether or not the first metal heater is operated in accordance with the operation command and reissuing the operation command when the first metal heater is not operated in accordance with the operation command.

7. The metal heater system of claim 6, wherein:
the device controller transmits the pipeline temperature, stored in a computer-readable storage medium, to a server.

8. The metal heater system of claim 7, wherein:
the server receives a remote control signal from a computer or smart device, and transfers the remote control signal to the controller; and
the controller receives the remote control signal from the server.

* * * * *